Figure 1:
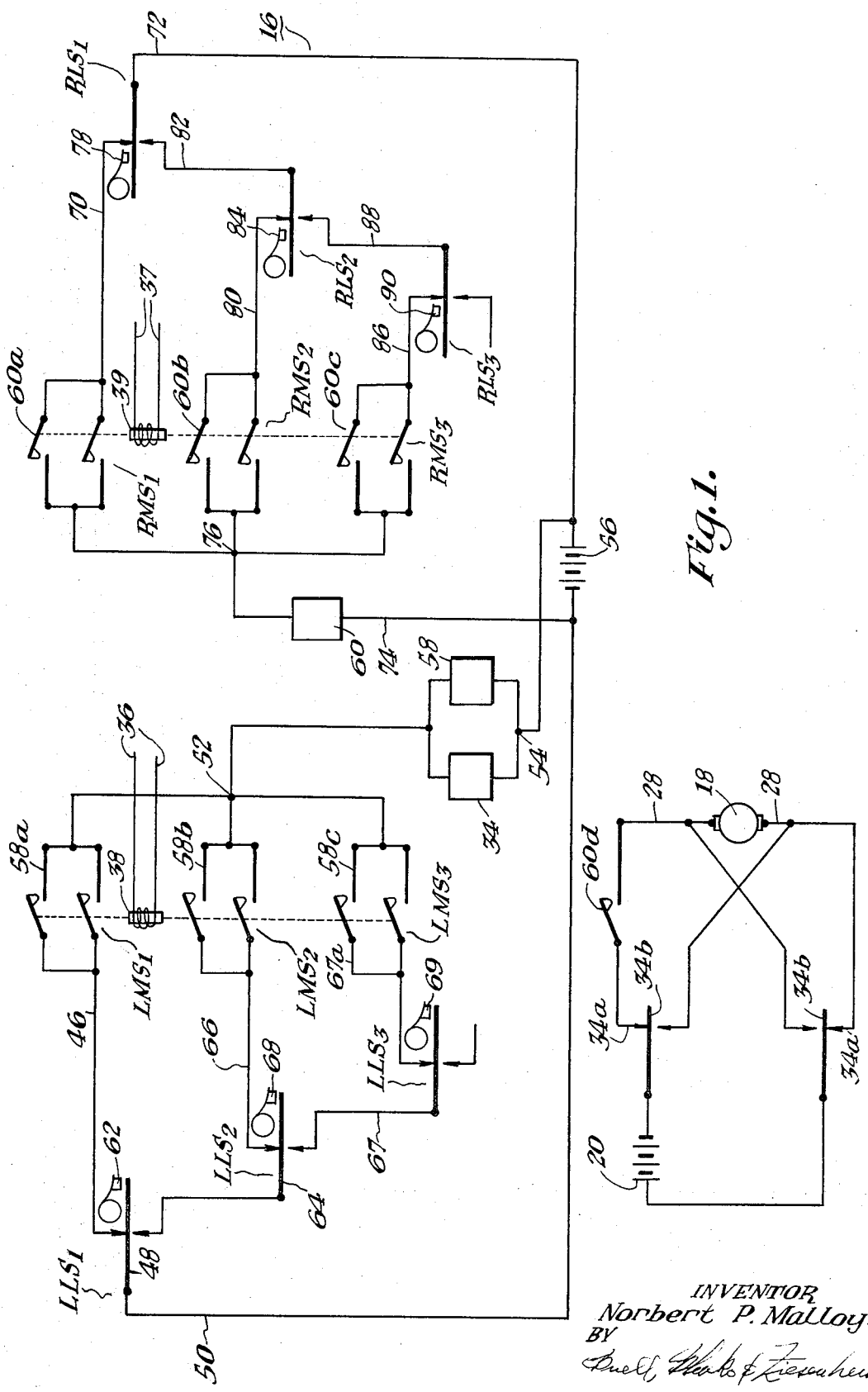

United States Patent
Malloy

[15] 3,668,499
[45] June 6, 1972

[54] STEERING CONTROL SYSTEM

[72] Inventor: Norbert P. Malloy, 5231 Gertrude St., Pittsburgh, Pa. 15207

[22] Filed: Apr. 27, 1970

[21] Appl. No.: 32,224

[52] U.S. Cl....................................318/587, 180/6.5
[51] Int. Cl......................................................G05d 1/08
[58] Field of Search...................180/6.5; 318/587, 580, 599

[56] References Cited

UNITED STATES PATENTS

| | | | |
|---|---|---|---|
| 2,493,755 | 1/1950 | Ferrill, Jr. | 318/587 X |
| 2,614,236 | 10/1952 | Alberts | 318/580 X |
| 2,905,878 | 9/1959 | Olson | 318/587 |
| 3,033,305 | 5/1962 | Harned et al. | 318/587 X |
| 3,482,644 | 12/1969 | Krieger et al. | 318/599 X |

*Primary Examiner*—B. Dobeck
*Attorney*—Buell, Blenko & Ziesenheim

[57] ABSTRACT

An automatic steering control system for use with a steerable vehicle or other craft having a steering mechanism, the combination comprising reversible steering actuating means for displacing said steering mechanism in relatively opposite directions to control the course of said vehicle or craft, steering control circuitry for energizing said actuating means in relatively opposite directions, said circuitry comprising a plurality of first circuit paths for energizing said steering actuating means in a given direction, and a plurality of second circuit paths for energizing said steering actuating means in the opposite direction, actuating and limiting switch means coupled in each of said circuit paths, each of said limit switch means having normally closed contact means coupled in its associated path in series with the associated actuating switch means and normally open contact means coupled to an adjacent one of said circuit paths so that said circuit paths can be energized successively for incremental operation of said steering actuating means in a given direction upon repeated and simultaneous actuation of all of the actuating switch means corresponding to such directional operation.

16 Claims, 2 Drawing Figures

INVENTOR
Norbert P. Malloy.
BY
HIS ATTORNEYS.

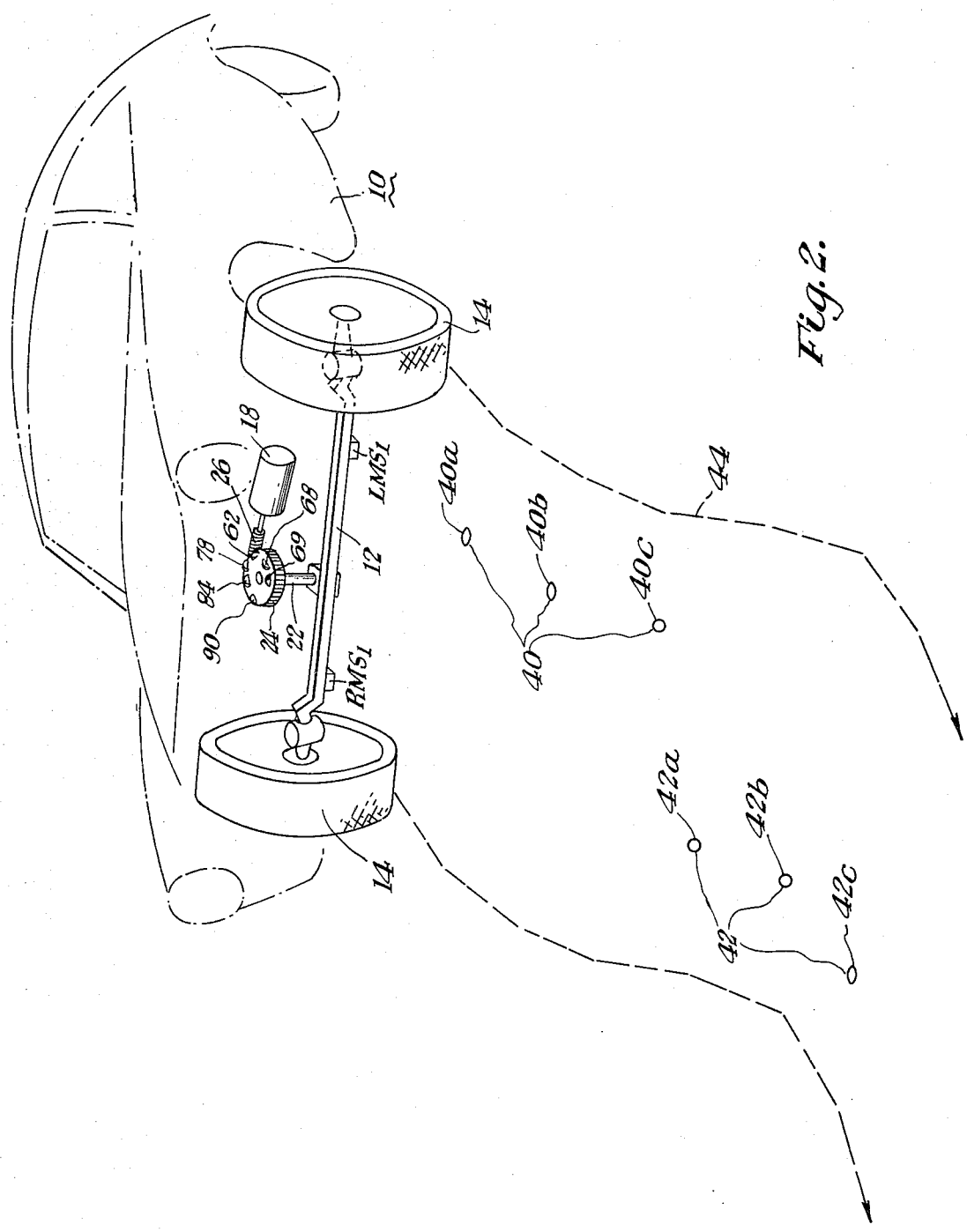

STEERING CONTROL SYSTEM

The present invention relates to an automatic steering mechanism, particularly one which can be actuated from a remote location, or which can be programmed, to effect the travel of a related vehicle or other craft along a prescribed course.

My invention can be adapted for utilization in a variety of applications, not of the least possibility of which are uses involving private and commercial vehicles of various types. Nor are such applications limited to vehicles used on land but the invention can be adapted with equal facility for use with remotely operable air or water craft. The invention is particularly amenable at least in certain of its modifications, for use in connection with various types of services vehicles, for example lawnmowers, grocery carts, forklift trucks and similar vehicles, which in their conventional modifications are not customarily employed with definable rails or tracks or other mechanical path establishing means.

The simplicity and ease of operation of the steering control system, together with its capability for pre-programming recommend usage also in toys and model constructions. For example, toy automobiles, boats and air craft, can thus be driven and controlled within a defined area. A further potential use is the transportation or other manipulation of sensitive, unstable, or other hazardous materials, for example, radioactive substances or highly sensitive explosives, within an enclosed space, which is sometimes hermetically sealed.

Conventional, automatic steering mechanism of various types are legion and have been well known for many years. For the most part, known automatic steering mechanisms or systems have been developed primarily for substantially unidirectional application for course maintenance as in the case of automatic pilots for aircraft. These systems although satisfactory for the intended purpose, are overly complicated and difficult of operation for the applications mentioned previously. Although remote-controlled steering or piloting systems have been developed, for example, in drone aircraft, complicated transmitting and receiving circuits are required.

The same rationale applies to radio-controlled model boats and aircraft popular with advanced hobbyists. Complex wireless systems are obviously inapplicable for the many types of service vehicles which at present required operating personnel. Similarly, known steering systems are overly large in physical size for use in the vast majority of toy vehicles and model constructions.

Examples of the aforementioned prior art are presented by the U.S. Pats. to Bonner, No. 3,002,140, VanOort, No. 3,047,783, Russell, No. 2,866,930 and Bonner No. 2,858,836. Each of these patents discloses an automatic steering system which is admirably suited for specific intended purposes. However, these prior mechanisms do not afford the flexibility, ease of operation and programming potentials for those applications contemplated by my invention. For example, the Bonner U.S. Pat. Nos. 3,002,140 and 2,858,836 respectively disclose signal controlled and mechanically controlled escapement mechanisms for model airplanes or the like. Each of these steering mechanisms requires the continuous application of signal or signals at the termination of which the steering mechanism automatically neutralizes or returns to a zero position. These mechanisms therefore would be difficult to pre-program or otherwise to operate in the applications mentioned previously. Moreover, the patented mechanisms require continuous manipulation by the operator.

The Russell and VanOort patents cover respectively a compass controlled autopilot and a particular wireless system for transferring signals to a signal controlled steering mechanism for toys and model constructions, which are obviously unsuited for the aforementioned applications, in view of their complex nature.

I overcome these problems by providing a remotely actuated steering control system mechanism which is admirably suited for the aforementioned applications. My novel steering control system incorporates stepwise steering actuation controlled by relay actuated means. The relay means can be controlled by appropriate, intermittent signals either by wire or wireless transmission means. Alternatively, my steering control system can be preprogrammed through the use of a programming timer switch or by locating signal generating devices, such as permanent magnets or electromagnets along a path or course to be followed by the vehicle. The latter arrangement is especially advantageous where a service vehicle, such as a lawnmower, forklift truck or grocery cart is intended to follow a prescribed or repetitive course or path. Another feature of my invention involves the use of momentarily emitted signals for control of the steering mechanism such that the operation of the remote control means does not require the operator's constant attention or manipulation. By the same token, usage of momentary or intermittent control signals permits my novel steering mechanism to be readily programmed or otherwise controlled by the aforementioned magnetic means, by suitable and conventional timing mechanisms, or remotely by relatively simple remote-control circuitry.

I accomplish these desirable results by providing, in an automatic steering control system for a vehicle or the like, steerable craft having a steering mechanism, the combination comprising reversible steering actuating means for said steering mechanisms, said actuating means being capable of actuating said steering mechanism to apply relatively opposite directional forces to said vehicle or craft, circuitry for said steering actuating means, said circuitry including at least one circuit path coupled to said steering actuating means for energizing said actuating means in one direction and at least one additional circuit path coupled to said actuating means for energizing said actuating means in the opposite direction, each of said circuit paths including limit switch means and actuating switch means, and means coupled to said steering mechanism for each of said limit switch means and disposed to actuate the associated one of said limit switch means upon a predetermined directional displacement of said steering mechanism.

I also desirably provide a similar automatic steering control system wherein switch manipulating means for said actuating switch means are positioned along a predetermined path.

I also desirably provide a similar automatic steering control system wherein each of said actuating switch means includes a magnetic switch, and each of said switch manipulating means are magnetic means positioned along said predetermined path.

I also desirably provide an automatic steering control system for use with a steerable vehicle or other craft having a steering mechanism, the combination comprising reversible steering actuating means for displacing said steering mechanism in relatively opposite directions to control the course of said vehicle or craft, steering control circuitry for energizing said actuating means in relatively opposite directions, said circuitry comprising a plurality of first circuit paths for energizing said steerable actuating means in a given direction, and a plurality of second circuit paths for energizing said steering actuating means in the opposite direction, actuating and limiting switch means coupled in each of said circuit paths, each of said limit switch means having normally closed contact means coupled in its associated path in series with the associated actuating switch means and normally open contact means coupled to an adjacent one of said circuit paths so that said circuit paths can be energized successively for incremental operation of said steering actuating means in a given direction upon repeated and simultaneous actuation of all of the actuating switch means corresponding to such directional operation.

I also desirably provide a similar automatic steering control system wherein first closure means are provided for simultaneously closing the actuating switch means of said first circuit paths, and second closure means are provided for simultaneously closing the actuating switch means of said second circuit paths.

I also desirably provide a similar automatic steering control system wherein each of said actuating switch means includes a magnetic switch, each of said closure means includes an electromagnet juxtaposable to the associated group of said magnetic switches, and means for energizing said electromagnets remotely.

I also desirably provide a similar automatic steering control system wherein said actuating switch means each includes magnetic switches, said first and said second closure means include magnetic means positioned along a predetermined path for said vehicle or craft for operating respective ones of said magnetic switches when said vehicle or craft is juxtaposed thereto for steering said vehicle or craft along said path.

I also desirably provide a method for automatically steering a vehicle or the like steerable craft comprising the step of defining a predetermined course for said vehicle, applying steering force to said vehicle or craft, controlling the application of said force by means of signals and generating said signals at a number of predetermined and spaced locations along said path.

During the foregoing discussion, various objects, features and advantages of the invention have been set forth.

These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 1 is a schematic circuit diagram of one arrangement of an automatic steering control system in accordance with my invention; and FIG. 2 is an isometric view partially broken away, of a vehicle incorporating my novel steering system and utilizing a pre-programming feature of the invention.

Referring now more particularly to the drawings, a vehicle 10 of any suitable and conventional configuration is provided with a conventional steering mechanism including in this example a pivotally mounted front axle 12 and a pair of wheels 14. It will be understood of course that the vehicle 10 can be provided instead with a pivoted rear axle for steerage or with a single steerable wheel (not shown) mounted either in the front or rear of the vehicle. It will also be understood that in place of the vehicle 10 other forms of steerable land, water, or reaction aircraft can be accommodated within the principles of my invention. In such case, the steering mechanism 12, 14 would be replaced by a similarly steerable rudder for water craft and in the case of aircraft additionally by ailerons and/or elevators. For reaction vehicles or crafts the aforementioned steering members or mechanisms can be replaced by one or more pairs of vernier jets or rockets, together with actuating means for their intermittent and alternate operation, for steering purposes. Each of these steering members or mechanisms displaced or otherwise actuated to the right or to the left (or up and down, as the case may be) in varying steerage functions with the steering control system of the invention.

The vehicle or craft can be propelled along a predetermined path (such as the path 44 in FIG. 2) by any conventional means, including suitable self-propelling means (not shown) mounted on the vehicle or craft.

The steering control mechanism 16 (FIG. 1) includes, in this example, steering member displacements or reversible drive means, such as electric motor 18 powered from a suitable potential source, represented here by battery 20. In the specific application shown in FIG. 2, the steering actuating means or steering motor 18 can be mounted adjacent the steering mechanism 12–14, i.e., in the forward portion of the vehicle 10. The motor 18 is arranged to steer the vehicle 10 by pivoting the axle 12 about its vertical pivot suspension 22 through a suitable transmission. In this arrangement the transmission can include worm gear 24 mounted on the axle pivot 22 for turning the axle 12 about the aforementioned vertical axis and worm 26 secured to an output shaft of the motor 18. Other components of the steering control system 16, which are illustrated in FIG. 1, can also be mounted (not shown) on the vehicle 10 or other craft controlled by the invention.

Where an actual battery 20 or other suitable DC source is employed, the steering motor 18 can be reversed simply by reversing the applied polarity through motor leads 28, 30 and polarity reversing relay contact means 34a, 34b. The contact means 34a, which are normally closed as shown in FIG. 1 and normally open contact means 34b are controlled by reversing relay coil 34 which in turn is energized at particular intervals by operation of the steering control circuit 16 of FIG. 1.

The steering control circuit 16, by superimposing a control function upon the reversible operation of the steering motor 18, is capable of moving the steering mechanism 12–14 of the vehicle 10 to the left or to the right in one or more predetermined steering increments. The increments of left and right deviation can, if desired, be made unequal, either within the left or right incremental groups or the left steering increments can be made unequal to the right increments. In this case, all of the left and right increments are made equivalent. In the illustrated arrangements, three equal increments of deviation are available for either right or left steerage (or up and down in the case of elevators or ailerons for steering aircraft), although it will be readily apparent that a different number of increments can be employed and that different incremental values can be selected of equal or unequal sizes.

In the arrangement shown a plurality of actuating switch means, typified in the exemplified arrangement by magnetic switches or the like, are employed to initiate the steering control function of the circuit 16. In this embodiment of the invention three magnetic reed switches $LMS_1$, $LMS_2$ and $LMS_3$ are employed to control the leftward movements or incremental deviations of the steering mechanism 12–14 while a similar three magnetic switches $RMS_1$, $RMS_2$ and $RMS_3$ are similarly employed for rightward movements. Each group of reed switches $LMS_{1-3}$ or $RMS_{1-3}$ can be simultaneously energized because of the selective circuit functions exercised by related components of the FIG. 1 control circuit, as explained below.

Thus the steering circuit 16 can be actuated very simply by manual operation of a remote wired or wireless transmission means (not shown) in place of the course-situated, programming arrangement described below in connection with FIG. 2. Such transmission means can supply a momentary switch energizing signal or conductors 36 or 37 for momentary energization of associated magnetic means, such as an electromagnet 38 or 39. The proximate electromagnet 38 or 39 is magnetically coupled to each magnetic switch of the associated group of switches $LMS_{1-3}$ or $RMS_{1-3}$. As explained more fully below it is necessary to provide only one actuating magnetic means 38 and 39 for each group of magnetic switches as only one of each group of switches is actively coupled into the circuit 16 at a given time, as determined by a prior operative sequence of the control circuit 16. This arrangement of the leftward and rightward groups of actuating means $LMS_{1-3}$ and $RMS_{1-3}$ considerably simplifies usage of the aforementioned remote control circuitry or of the pre-programmed arrangement of FIG. 2, for steering the vehicle 10 or other steerable craft.

It will also be understood that a push-button type spot switch can be substituted for each of the leftward and rightward magnetic switches and a single or common mechanical actuator (not shown) can be provided for each of the two groups of leftward and rightward switches, respectively.

Alternatively as shown in FIG. 2, the proximate control electromagnets 36 can be replaced by course-situated magnetic means positioned along a predetermined path or course 44 or series of such courses, for the vehicle 10. In the arrangement of FIG. 2 the magnetic means 40,42 can be permanent magnets. This arrangement, i.e., with permanent magnets serving as the course-situated switch-manipulating means, is appropriate for a single, repetitive course 44. Where a branched course or a series of courses (not shown) are contemplated the permanent magnets 40, 42 can be replaced by electromagnets such as the electromagnets 38, 39 of FIG. 1 or by other switch-manipulating means (not shown) so that appropriate ones of the course-situated switch-manipulating means can be selectively and remotely energized to guide the vehicle 10 along a selected one of a series of course or along a portion of a branched course.

The left switch means $LMS_1$, $LMS_2$ and $LMS_3$ desirably are mounted adjacent the underside of the vehicle 10 for cooperation with the leftward course magnets 40. The rightward switch means $RMS_1$, $RMS_2$ and $RMS_3$ can be similarly disposed for cooperation with the rightward course magnets 42. As noted more generally above, the magnets 40, 42 can be permanent magnets in the event that the vehicle 10 is to be confined to a given course 44, such as in the case of a lawnmower, or alternatively electromagnets or equivalent switch-manipulating means can be employed in place of the course magnets 40, 42 where the vehicle 10 will be subject to various routes as in the case of a forklift truck, grocery cart or the like. Similar considerations apply to the other potential applications of the invention, such as those enumerated previously.

In further explanation of the operative characteristics of the steering control circuit 16, it will be assumed that a leftward increment of steerage is to be applied to the steering mechanism 12–14 (or similar steering mechanism) by momentary closure of the switch contacts $LMS_1$, either by the associated left switch group electromagnet 38 or by the initial course magnet 40a (FIG. 2). At this time, a circuit is momentarily completed through conductor 46, normally closed contact 48 of the first increment, left limit switch $LLS_1$, conductor 50, branched conductors 52, 54, relay battery 56, holding relay coil 58 and polarity reversing relay coil 34.

It will be understood that the power supplies 20, 56 can be combined into a common source (not shown) if desired, and for this purpose a source having dual voltage levels can be used, if necessary.

Energization of the holding relay coil 58 maintains the aforementioned circuit by closing normally open relay contacts 58a, 58b and 58c connected in bypassing relation to the actuating switch contacts $LMS_{1-3}$ respectively. Of course, the closure of holding contacts 58b, 58c is ineffective at this time as their related circuits are now isolated by the normally open contacts of the first left limit switch $LLS_1$. Energization of the polarity reversing relay coil 34 closes the normally open relay contacts 34b in the steering motor circuit, such that the steering motor 18 is operated in a direction to produce, in this example, a counterclockwise angular displacement of worm gear 24 to drive the steering mechanism 12–14 to the left.

It should be noted here that the switch contacts $LMS_2$ and $LMS_3$ are also momentarily closed by the initial course magnet 40a but are ineffective in the steering control circuit 16 at this point owing to the contact position of the first left limit switch $LLS_1$, which interrupts the circuit paths associated respectively with the contacts $LMS_2$ and $LMS_3$.

Operation of the steering motor 18 is continued until the first left limit switch $LLS_1$ is tripped to open its normally closed contacts thus interrupting the aforedescribed circuit path 46–54, including battery 56 and the holding relay contacts 58a. The left holding relay coil 58 and the polarity reversing relay coil 34 are de-energized thereby disengaging their normally open contacts 58a–58c and 34a, respectively. However, the steering motor 18 is not driven in its opposite directional rotation at this time owing to normally open holding relay contacts 60d of the right holding relay coil 60, the operation of which is described more fully below.

The operating interval of the steering motor 18 thus defined by the interval from momentary closure of the switch contacts $LMS_1$ to the switching of the limit switch means $LLS_1$, can be selected to describe a specific angular disposition of the steering mechanism 12–14, for example 15°. A different displacement of the steering mechanism can, of course, be defined and will depend upon the selected location of a cam actuator 62 (acting through suitable connective circuitry, not shown) or other switch-actuating means for the first left limit switch $LLS_1$ and suitably disposed for example on the worm gear 24 (FIG. 2). The left and right limit switches $LLS_{1-3}$ and $RLS_{1-3}$ in this arrangement are suitably positioned about the periphery of the worm gear 24, but are omitted from FIG. 2 for purposes of clarity. From the arrangement as thus far described, it will be readily apparent that each of the left and right actuating switches $LMS_{1-3}$ and $RMS_{1-3}$ and the left and right limit switches $LLS_{1-3}$ and $RLS_{1-3}$ can be similarly interconnected to define corresponding similar equal or unequal angular displacements of the worm gear 24, depending upon the particular increments of steering control which are desired.

If the steering mechanism 12–14 has been displaced to the left, as by the aforedescribed momentary actuation of $LMS_1$, the path of the vehicle can be restored to a parallel or nearly parallel course by restoring the steering mechanism 12–14 to its straight ahead position by actuation of rightward switch means $RMS_1$ to complete its corresponding circuit path for a rightward steering increment in the manner described below. Similarly, the vehicle can be steered in varying degrees to the right at this time by actuation of $RMS_2$ or $RMS_3$, whose attendant circuit functions are likewise described below.

For purposes of illustration, however, it will be assumed that the vehicle 10 is to be steered further to the left when it has proceeded further along the path 44 to a juxtaposition with the second course magnet 40b (FIG. 2).

At this time, all of the three left actuating switches $LMS_{1-3}$ are again momentarily closed. However, the closure of $LMS_1$ and $LMS_3$ are now ineffective in the control circuit 16, as $LMS_1$ has been electrically isolated by actuating the $LLS_1$ to close its normally open contacts, while $LMS_3$ is further isolated by the normally open contacts of $LLS_2$. Accordingly a circuit path is momentarily formed through conductors 64, 66, the previously mentioned conductors 50–54, the battery 56, and the normally closed contacts of $LLS_2$. This second circuit path again energizes the left holding relay coil 58 and the polarity reversing relay coil 34 to lock in the described circuit path through relay contacts 58b and to actuate the steering motor 18 in the same direction through closure of normally open reversing relay contacts 34b. Accordingly the steering mechanism 12–14 is driven further to the left by further displacement of worm gear 24 until, as shown in FIGS. 1 and 2, a second left cam member 68 (acting through suitable connective circuitry, not shown) on the worm gear or equivalent switch manipulating means actuates $LLS_2$ to open its normally closed contacts and interrupts the aforementioned circuit including conductors 64, 66, at which time the steering motor 18, the left holding relay coil 58 and the polarity reversing relay coil 34 again become deenergized. When the worm gear 24 has reached the terminus of its second leftward increment as defined by the location of the cam 68 further movement of the steering mechanism 12–14 is interrupted by opening of the normally closed contacts of $LLS_2$. At this point the steering mechanism 12–14 including the worm gear 24 has been moved through two leftward increments with a combined angular displacement of an exemplary 30°, although the increments of different or differing magnitudes can be selected. In any event, the exemplification of FIG. 2, has at this junction, further steered the vehicle 10 to the left along its prescribed course 44.

Again the rightward magnetic switches $RMS_{1-3}$ can be actuated at this point (by suitably placed course magnets or equivalent — not shown) either for the purpose of straightening the vehicular course or for steering the vehicle further to the right. For the purposes of this explanation, however, it will be assumed that the vehicle has proceeded in a further leftward course along path 44 to a juxtaposition with the third course magnet 40c. The leftward magnetic switches $LMS_{1-3}$ are again momentarily actuated to their contact closed positions, although only $LMS_3$ is effective owing to the previous manipulations of $LLS_1$ and $LLS_2$ to close their normally open contacts and to open their normally closed contacts in electrical isolation of $LMS_1$, $LMS_2$ and their associated circuit paths. The momentary closure of $LMS_3$ closes the holding relay contacts 58c and the motor polarity reversing contacts 34b in a similar manner to again energize the steering motor 18 for a further increment of leftward steering movement, through energization of the related circuit path, including conductors 50–54, 64, 67, 67a and associated components.

It will now be assumed, for explanatory purposes, that the vehicle 10 will undergo a series of incremental steering corrections in the opposite or rightward direction. For the first rightward steering correction it is assumed that the vehicle 10 has progressed to a juxtaposition with the next course magnet 42a. Desirably, the course magnets 40 and 42 are disposed in respectively opposite polarity positions (as are the magnetic switches $LMS_{1-3}$ and $RMS_{1-3}$) such that only the left hand magnetic switches $LMS_{1-3}$ are actuated simultaneously by the course magnets 40 while only the right hand magnetic switches $RMS_{1-3}$ are similarly operated by the course magnets 42. Accordingly, when the first rightward course magnet 42a is reached, all of the rightward magnetic switches $RMS_{1-3}$ are momentarily actuated to their contact close positions. Closure of the switches $RMS_2$ and $RMS_3$ has no effect on the circuit at this time as they are isolated by closure of the normally closed contacts of the right limit switch $RLS_1$.

Closure of $RMS_1$ therefore momentarily establishes a circuit through the $RMS_1$ contacts, conductor 70, the normally closed $RLS_1$ contacts, conductor 72, the relay battery 56, conductor 74, the right holding relay coil 60 and branched conductor 76. The left holding relay coil 58 and the polarity reversing coil 54, of course, are not energized at this time. The right holding relay contacts 60a, 60b, 60c associated respectively with the circuit paths including the contacts of the right magnet switches $RMS_{1-3}$ and the holding relay contacts 60d in the forward circuit path of the steering motor 18 are manipulated to their closed positions by energization of the right relay holding coil 60. The right holding relay contact 60b and 60c are effectively isolated from their respective circuit paths at this time for the reason assigned above in connection with $RMS_2$ and $RMS_3$.

In consequence, the aforementioned circuit path is maintained after opening of the $RMS_1$ contacts, as the vehicle leaves the course magnet 42a, by the holding relay contacts 60a, and the steering motor 18 is energized in a direction opposite to that described above, by closure of the right holding relay contacts 60d and by the normally closed position of the polarity reversing relay contacts 34a in series therewith. The worm gear 24 (FIG. 2) accordingly is rotated in the opposite, or in this example, the clockwise direction by the steering motor 18 until cam member 78 on the worm gear 24 or equivalent switch manipulating means, actuates the associated right limit switch $RLS_1$ to close its normally open contacts and thus to de-energize the right holding relay coil 60.

The steering control circuit 16 is now conditioned for circuit switching action by only $RMS_2$ when the second rightward course magnet 42b is reached by the vehicle 10, and all of the right actuating switches are again simultaneously closed. A second circuit path is again established throughout the right hand portion of the steering control circuit 16 and includes in this case conductors 80, 82 the previously enumerated conductors 72–76, the normally closed contacts of $RLS_2$, and the now closed but normally open contacts of $RLS_1$. Operation of the steering motor 18 is repeated in the manner last described until a second right cam member 84 or equivalent limit switch-manipulating means, actuates the associated limit switch $RLS_2$ to close its normally open contacts and to terminate the operation of the steering motor 18 with opening of the normally closed contacts of $RLS_2$.

With the actuation of $RLS_1$ and $RLS_2$ to close their normally open contacts, the steering control circuit 16 is primed for effective operation of its third rightward magnetic switch $RMS_3$, and attendant energization of its associated circuit path, for a further steerage increment in the right hand direction. This occurs when the vehicle 10 becomes juxtaposed to course magnet 42c to close again all of the rightward switches $RMS_{1-3}$, with effective closure of $RMS_1$ only. The related rightward steering circuit path including conductors 86, 88, the previously mentioned conductors 72–76 and 82, and associated circuit components is thereby by right holding relay contacts 60c. The resulting third incremental energization of the steering motor 18 continues until the associated limit switch $RLS_3$ is actuated to close its normally open contacts by cam member 90 on worm gear 24, or equivalent means.

Desirably, the limit switches $LLS_{1-3}$ and $RLS_{1-3}$ are mechanically latched or stepped spdt switches such that upon each engagement with their associated cam members (by actuation of the worm gear 24, or other steering mechanism, in either direction) each limit switch is actuated or stepped to its opposite condition. Thus, upon each reversal of the worm gear 24 the one or more of the limit switches $LLS_{1-3}$ and $RLS_{1-3}$ which have been actuated by a given directional displacement of the worm gear 24, are restored to the closed contact positions of their normally closed contacts as illustrated in FIG. 1. With this arrangement, the steering control circuit 16 is preconditioned for a course change in an opposite direction as well as for an additional increment of course change in the same general direction. Obviously, then, it is not necessary for the steering control mechanism to be stepped through all of its available increments of course correction in one direction, for example the leftward direction, before being stepped through its available increments of correction in the rightward (opposite) direction. Rather, one or two correctional increments can be initiated by the circuit 16 in one direction (for example the leftward direction) followed by one or two increments in the opposite (rightward) direction. It follows, then, that the leftward and rightward course magnets 40, 42 can be intermingled in any desired sequence, to obtain any prescribed course rather than being grouped respectively together as shown in FIG. 2. Obviously, too, longer or shorter and varying distances can be established between adjacent ones of the course magnets 40, 42.

The use of a particular power transmission is of course exemplary in FIG. 2. Other transmissions, such as bevel gears, belt or chain drive, or crank, can be used to transfer power from the steering motor 18 or equivalent steering actuating means to the steering mechanism 12–14 or equivalent.

From the foregoing it will be apparent that novel and efficient forms of a steering control system have been described herein. While I have shown and described certain presently preferred embodiments of the invention and have illustrated presently preferred methods of practicing the same, it is to be distinctly understood that the invention is not limited thereto, but may be otherwise variously embodied and practiced within the spirit and scope of the invention.

I claim:

1. In an automatic steering control system for a vehicle or the like steerable craft having a steering mechanism, the combination comprising reversible steering actuating means for said steering mechanism, said actuating means being capable of actuating said steering mechanism to apply relatively opposite directional forces to said vehicle or craft circuitry for said steering actuating means, said circuitry including at least one circuit path coupled to said steering actuating means for energizing said actuating means in one direction and at least one additional circuit path coupled to said actuating means for energizing said actuating means in the opposite direction, each of said circuit paths including limit switch means and actuating switch means, and means coupled to said steering mechanism for each of said limit switch means and disposed to actuate the associated one of said limit switch means upon a predetermined directional displacement of said steering mechanism.

2. The combination according to claim 1 wherein each of said circuit paths includes a holding relay having normally open contact means in parallel with said actuating switch means respectively.

3. The combination according to claim 2 wherein said steering actuating means is a reversible electric motor, one of said circuit paths includes a polarity reversing relay having normally closed relay contact means in a forward current path including said motor and normally open relay contact means in a reverse current path including said motor, and the holding relay of the other of said circuit paths includes normally open contact means in said forward current path and in series with said normally closed contact means of said polarity reversing relay.

4. An automatic steering control system for use with a steerable vehicle or other craft having a steering mechanism, the combination comprising reversible steering actuating means for displacing said steering mechanism in relatively opposite directions to control the course of said vehicle or craft, steering control circuitry for energizing said actuating means in relatively opposite directions, said circuitry comprising a plurality of first circuit paths for energizing said steering actuating means in a given direction, and a plurality of second circuit paths for energizing said steering actuating means in the opposite direction, actuating and limiting switch means coupled in each of said circuit paths, each of said limit switch means having normally closed contact means coupled in its associated path in series with the associated actuating switch means and normally open contact means coupled to an adjacent one of said circuit paths so that said circuit paths can be energized successively for incremental operation of said steering actuating means in a given direction upon repeated and simultaneous actuation of all of the actuating switch means corresponding to such directional operation.

5. The combination according to claim 4 wherein said limit switch means are selectively actuated by camming members mounted at selected positions on said steering mechanism.

6. The combination according to claim 4 wherein a first holding relay is coupled to said first circuit paths, and second holding relay is connected to said second circuit paths, each of said holding relays having bypassing contact means connected in parallel with each of the associated actuating switch means respectively.

7. The combination according to claim 4 wherein said actuating means is energizable through reversing electric circuit means, and a polarity reversing relay is coupled to one of said first and said second groups of circuit paths, said reversing relay including normally closed contact means in a forward current portion of said reversing circuit means and normally open contacts in a reverse current portion of said reversing circuit means.

8. The combination according to claim 7 wherein an additional relay is coupled to the other of said first and said second groups of said circuit paths, said additional relay having normally open contact means coupled in said forward current portion and in series with said normally closed reversing relay contact means.

9. The combination according to claim 8 wherein said additional relay is provided with holding contact means connected in electrical parallel with the actuating switch means respectively of said other group of circuit paths.

10. The combination according to claim 9 wherein a holding relay is coupled to said one group of circuit paths and is provided with contact means coupled respectively in electrical parallel with the associated actuating means.

11. The combination according to claim 4 wherein first closure means are provided for simultaneously closing the actuating switch means of said first circuit paths, and second closure means are provided for simultaneously closing the actuating switch means of said second circuit paths.

12. The combination according to claim 11 wherein each of said actuating switch means includes a magnetic switch, each of said closure means includes an electromagnet juxtaposable to the associated group of said magnetic switches, and means for energizing said electromagnets remotely.

13. The combination according to claim 4 wherein each of the actuating switch means of said first circuit paths is a magnetic switch, and each of said actuating means of said second circuit paths is a magnetic switch effected by a different magnetic polarity, and magnetic means of given magnetic polarities are positioned along a predetermined path for said vehicle or craft for actuating respective ones of said magnetic switches when said vehicle or craft is juxtaposed to said magnetic means for steering said vehicle or craft along said path.

14. The combination according to claim 1 wherein switch-manipulating means for said actuating switch means are positioned along said predetermined path for said vehicle or craft for operating a preselected one of said switch means upon juxtaposition of said vehicle or craft to said switch-manipulating means for steering said vehicle or craft along said path.

15. The combination according to claim 1 wherein each of said actuating switch means includes a magnetic switch, and each of said switch-manipulating means are magnetic means positioned along said predetermined path.

16. The combination according to claim 11 wherein said actuating switch means each includes magnetic switches, said first and said second closure means include magnetic means positioned along a predetermined path for said vehicle or craft for operating respective ones of said magnetic switches when said vehicle or craft is juxtaposed thereto for steering said vehicle or craft along said path.

* * * * *